Patented May 28, 1940

2,202,046

UNITED STATES PATENT OFFICE 2,202,046

PROCESS FOR THERMAL DEHYDRATION OF LOWER FATTY ACIDS

Henry Dreyfus, London, and Leonard Fallows, Spondon, near Derby, England, assignors to Celanese Corporation of America, a corporation of Delaware No Drawing. Application July 7, 1937, Serial No. 152,378. In Great Britain July 13, 1936

20 Claims. (Cl. 260—547)

This invention relates to improvements in the thermal dehydration of aliphatic acids, and is more particularly concerned with the manufacture of acetic anhydride or ketene by the thermal dehydration of acetic acid.

The general method of manufacturing acetic anhydride or ketene directly from acetic acid is to subject the acetic acid to thermal decomposition or dehydration, usually in the presence of suitable catalysts. While dehydration takes place over a wide range of temperature, the most useful range is generally 500–1000° C. and especially 600–900° C., though of course the optimum temperature naturally depends upon the particular conditions employed and notably the particular catalyst and the pressure or partial pressure of the acetic acid. Patent No. 1,735,962 describes catalysing the reaction by means of a phosphoric acid and indicates that the process may be carried out under reduced pressure or at ordinary pressure. Further, Patent No. 1,883,353 shows that it is advantageous to carry out the reaction in presence of bases, and in particular ammonia and the organic bases which are substitution products of ammonia, for example pyridine, piperidine, aniline, alkyl anilines, toluidines and the like. Again in this patent it is indicated that while the reaction may be carried out at pressures higher than atmospheric, it is preferable to employ atmospheric pressure or reduced pressure. The amount of the ammonia, pyridine or other base may, for example be of the order of 1% based on the weight of the acetic acid subjected to thermal decomposition, or may be a smaller proportion. In the said patent it is indicated that the bases may be used in conjunction with the known catalysts for promoting the thermal decomposition of the acetic acid, and in particular it is stated that as catalyst there may be used the phosphates of the bases. Obviously instead of using phosphoric acid itself combined with the base, substances yielding phosphoric acid under the reaction conditions may be used.

The present invention is concerned with the thermal dehydration of acetic acid by processes of the type referred to, in which phosphoric acid, alone or together with ammonia or a volatile organic nitrogenous base, is employed as catalyst. According to the invention the acetic acid is vaporised, subjected to preheating and passed into the reaction zone in which the thermal dehydration takes place and the catalyst is introduced into the stream of superheated acetic acid vapor in the form of a solution.

The catalyst solution should be of such a concentration that the quantity to be introduced is quite small in relation to the quantity of acid subjected to thermal dehydration, representing say about 5% of the weight of the acid. The solvent used for dissolving the catalyst may be varied to suit the particular catalyst it is desired to employ. Thus in some cases, for example with pyridine phosphate, piperidine phosphate, phosphates of the aromatic bases and phosphates of aliphatic bases containing two, three, four, or more carbon atoms, it is most convenient to use as a medium for the introduction of the catalyst the acid to be subjected to thermal dehydration. In other cases, for example with methylamine phosphate, ammonium phosphate or the like, it may be somewhat difficult to obtain a sufficiently concentrated solution in the anhydrous acid in the small auxiliary feed for the catalyst, and the catalyst may be dissolved in water or in aqueous acid. The water, especially as it will be present in a comparatively small amount, will not exercise any deleterious effect upon the reaction, since, as shown in Patent No. 1,735,959 dilute acetic acid may quite readily be used for the thermal dehydration.

As indicated below, in the separation of the products of the thermal dehydration, benzene, toluene, xylene, chlorbenzene and the like may be employed to form an azeotropic mixture with the water resulting from the thermal dehydration or introduced into the acid feed so as to facilitate separation of acetic anhydride from the water and/or ketene. Such a liquid may likewise be used as a vehicle for the introduction of the catalyst. For example, the catalyst, and especially the phosphates of heterocyclic, aromatic, alicyclic and the higher aliphatic bases, may be dissolved in benzene and introduced into the superheated acid vapour in the manner described above.

Where bases are to be employed in the process, the quantity of base may, as previously indicated, be of the order of 1% of the weight of the acetic acid subjected to decomposition or may be less, e. g., 0.2 to 0.5%. Similarly the proportion of phosphoric acid may be quite small and may be equivalent to the amount of base used. It is to be understood that, instead of phosphoric acid, substances yielding phosphoric acid may be employed, and instead of the phosphate of a base, the base together with a substance yielding phosphoric acid may be employed.

Where the chamber in which the thermal dehydration is effected is heated externally, baffles, designed to cause the vapors to scour the hot internal surface of the chamber may be provided. Thus a reaction tube may be provided at intervals with transverse baffles which block off the cross-section of the tube with the exception of a comparatively small area around the internal periphery of the tube. Such baffles may be mounted, for example, on a longitudinal rod or rods traversing the length of the tube. Alternatively baffles may be provided at intervals transverse to the length of the tube, and alternate baffles may be provided with holes for the passage of the gases near their periphery, and the remaining baffles with holes comparatively near their centre. If desired, any longitudinal supports for baffles may be made hollow and may provide the means for internal heating. Preferably, however, where internal heating is employed, the reaction tube or chamber is also externally heated. Likewise in preheating the acid vapor, a preheater fitted with baffles may be employed. It is preferred to raise the temperature of the acid vapor by the preheating step to within 20 to 70° C. of the temperature at which the thermal dehydration is to be effected but, if desired, the vapor may only be heated to within say 100° C. of this temperature or may be heated right up to the temperature of the thermal dehydration. As previously indicated temperatures of 600° to 900° C. are especially suitable for the thermal dehydration; very good results are obtained at temperatures of from 650° to 750° C.

As previously indicated, the reaction is best carried out at atmospheric pressure or at reduced pressure. Reduced pressure is of advantage where acetic anhydride is the desired product, and is also of somewhat greater advantage where ketene is desired. Generally, of course, a mixture of ketene and acetic anhydride is produced.

The acetic anhydride and/or ketene may be recovered from the reaction products in any suitable manner. For example, the reaction products may be cooled so as to condense the whole of the acetic anhydride, water and unchanged acetic acid and the ketene allowed to pass on, or the reaction products may be subjected to a fractionation treatment designed to separate the acetic anhydride from the water and ketene. In such a process it is of advantage to employ liquids such as benzene, toluene, xylene, chlorbenzene, chloroform and the like which form an azeotropic mixture with the water.

While the invention has been described above principally in relation to the thermal decomposition of acetic acid, it may be applied to the thermal dehydration of other aliphatic acids, for example propionic acid, butyric acid and the like.

The following example illustrates the process of the invention as applied to the thermal dehydration of acetic acid.

*Example*

Acetic acid is vaporised and the vapor is passed in a rapid stream first through a preheating tube maintained at a temperature of 600° to 650° C. and then through a reaction tube heated to 670° to 720° C. The reaction tube is provided at its inlet end with a Y-piece through one arm of which the superheated acetic acid vapor is introduced. The other arm of the Y-piece is closed and a narrow tube passes through the closure and projects just inside the arm. Through this tube, which is provided with a cooling jacket for some distance along its length beyond the arm of the Y-piece, is introduced an aqueous solution of phosphoric acid and ammonia corresponding to a solution of tri-ammonium-ortho-phosphate of 9–10% concentration, the aqueous solution being introduced in a quantity equal to about 5% by weight of the acetic acid feed. Water is circulated through the cooling jacket to prevent decomposition and to minimise evaporation of the solution being introduced. The solution meets the superheated acetic acid vapor at the junction of the two arms of the Y-piece, is vaporised and passes with the acid vapor through the leg of the Y-piece into the zone in which the dehydration takes place.

Acetic anhydride is separated from the products issuing from the reaction tube by fractional condensation in presence of sufficient benzene to retain in the vapor phase the water present in the products, while gases remaining uncondensed after condensation of the water and benzene mixture remaining after the separation of the anhydride are washed with water or acetic acid to recover any ketene present.

Having described our invention what we desire to secure by Letters Patent is:

1. Process for the catalystic thermal dehydration of a lower fatty acid having at least two carbon atoms, which comprises vaporizing the fatty acid, preheating the acid vapor to a temperature below that to be employed for the thermal dehydration by at most 100° C. and passing it into a reaction zone in which the thermal dehydration takes place and introducing into the preheated acid vapor a solution containing phosphoric acid.

2. Process for the catalytic thermal dehydration of a lower fatty acid having at least two carbon atoms, which comprises vaporizing the substantially anhydrous fatty acid, preheating the acid vapor to a temperature below that to be employed for the thermal dehydration by at most 100° C. and passing it into a reaction zone in which the thermal dehydration takes place and introducing into the preheated acid vapor an aqueous solution containing ammonia and phosphoric acid.

3. Process for the catalytic thermal dehydration of a lower fatty acid having at least two carbon atoms, which comprises vaporizing the substantially anhydrous fatty acid, preheating the acid vapor to a temperature below that to be employed for the thermal dehydration by at most 100° C. and passing it into a reaction zone in which the thermal dehydration takes place and introducing into the preheated acid vapor an aqueous solution containing a volatile organic nitrogenous base and phosphoric acid.

4. Process for the catalytic thermal dehydration of a lower fatty acid having at least two carbon atoms, which comprises vaporizing the substantially anhydrous fatty acid, preheating the acid vapor to a temperature below that to be employed for the thermal dehydration by at most 70° C. and passing it into a reaction zone in which the thermal dehydration takes place and introducing into the preheated acid vapor an aqueous solution containing ammonia and phosphoric acid.

5. Process for the catalytic thermal dehydration of a lower fatty acid having at least two carbon atoms, which comprises vaporizing the substantially anhydrous fatty acid, preheating the acid vapor to a temperature below that to be employed for the thermal dehydration by at most 100° C. and passing it into a reaction zone in which the thermal dehydration takes place and introducing into the preheated acid vapor an aqueous acetic acid solution containing pyridine and phosphoric acid.

6. Process for the catalytic thermal dehydration of a lower fatty acid having at least two carbon atoms, which comprises vaporizing the substantially anhydrous fatty acid, preheating the acid vapor to a temperature below that to be employed for the thermal dehydration by at most 100° C. and passing it into a reaction zone in which the thermal dehydration takes place at temperatures of from 650° to 750° C. and introducing into the preheated acid vapor an aqueous solution containing phosphoric acid.

7. Process for the catalytic thermal dehydration of a lower fatty acid having at least two carbon atoms, which comprises vaporizing the substantially anhydrous fatty acid, preheating the acid vapor to a temperature below that to be employed for the thermal dehydration by at most 100° C. and passing it into a reaction zone in which the thermal dehydration takes place at temperatures of from 650° to 750° C. and introducing into the preheated acid vapor an aqueous solution containing ammonia and phosphoric acid.

8. Process for the catalytic thermal dehydration of a lower fatty acid having at least two carbon atoms, which comprises vaporizing the substantially anhydrous fatty acid, preheating the acid vapor to a temperature below that to be employed for the thermal dehydration by at most 100° C. and passing it into a reaction zone in which the thermal dehydration takes place at temperatures of from 650° to 750° C. and introducing into the preheated acid vapor an aqueous acetic acid solution containing pyridine and phosphoric acid.

9. Process for the catalytic thermal dehydration of acetic acid, which comprises vaporizing substantially anhydrous acetic acid, preheating the acid vapor to a temperature below that to be employed for the thermal dehydration by at most 100° C. and passing it into a reaction zone in which the thermal dehydration takes place and introducing into the preheated acid vapor an aqueous solution containing phosphoric acid.

10. Process for the catalytic thermal dehydration of acetic acid, which comprises vaporizing substantially anhydrous acetic acid, preheating the acid vapor to a temperature below that to be employed for the thermal dehydration by at most 100° C. and passing it into a reaction zone in which the thermal dehydration takes place and introducing into the preheated acid vapor an aqueous solution containing ammonia and phosphoric acid.

11. Process for the catalytic thermal dehydration of acetic acid, which comprises vaporizing substantially anhydrous acetic acid, preheating the acid vapor to a temperature below that to be employed for the thermal dehydration by at most 100° C. and passing it into a reaction zone in which the thermal dehydration takes place and introducing into the preheated acid vapor an aqueous solution containing a volatile organic nitrogenous base and phosphoric acid.

12. Process for the catalytic thermal dehydration of acetic acid, which comprises vaporizing substantially anhydrous acetic acid, preheating the acid vapor to a temperature below that to be employed for the thermal dehydration by at most 70° C. and passing it into a reaction zone in which the thermal dehydration takes place and introducing into the preheated acid vapor an aqueous solution containing ammonia and phosphoric acid.

13. Process for the catalytic thermal dehydration of acetic acid, which comprises vaporizing substantially anhydrous acetic acid, preheating the acid vapor to a temperature below that to be employed for the thermal dehydration by at most 100° C. and passing it into a reaction zone in which the thermal dehydration takes place and introducing into the preheated acid vapor an aqueous acetic acid solution containing pyridine and phosphoric acid.

14. Process for the catalytic thermal dehydration of acetic acid, which comprises vaporizing substantially anhydrous acetic acid, preheating the acid vapor to a temperature below that to be employed for the thermal dehydration by at most 100° C. and passing it into a reaction zone in which the thermal dehydration takes place at temperatures of from 650° to 750° C. and introducing into the preheated acid vapor an aqueous solution containing phosphoric acid.

15. Process for the catalytic thermal dehydration of acetic acid, which comprises vaporizing substantially anhydrous acetic acid, preheating the acid vapor to a temperature below that to be employed for the thermal dehydration by at most 100° C. and passing it into a reaction zone in which the thermal dehydration takes place at temperatures of from 650° to 750° C. and introducing into the preheated acid vapor an aqueous solution containing ammonia and phosphoric acid.

16. Process for the catalytic thermal dehydration of acetic acid, which comprises vaporizing substantially anhydrous acetic acid, preheating the acid vapor to a temperature below that to be employed for the thermal dehydration by at most 100° C. and passing it into a reaction zone in which the thermal dehydration takes place at temperatures of from 650° to 750° C. and introducing into the preheated acid vapor an aqueous acetic acid solution containing pyridine and phosphoric acid.

17. Process for the catalytic dehydration of a lower fatty acid having at least two carbon atoms, which comprises vaporizing the fatty acid, preheating the vapors free from phosphoric acid to a temperature below that to be employed for the thermal dehydration by at most 100° C. and subjecting the preheated vapors to thermal dehydration in the presence of phosphoric acid.

18. Process for the catalytic dehydration of acetic acid, which comprises vaporizing the acetic acid, preheating the vapors free from phosphoric acid to a temperature below that to be employed for the thermal dehydration by at most 100° C. and subjecting the preheated vapors to thermal dehydration in the presence of phosphoric acid.

19. Process for the catalytic thermal dehydration of acetic acid, which comprises vaporizing the acetic acid, preheating the vapors free from phosphoric acid to a temperature below that to be employed for the thermal dehydration by at most 100° C. and subjecting the preheated vapors to thermal dehydration in the presence of phosphoric acid and ammonia.

20. Process for the catalytic thermal dehydration of acetic acid, which comprises vaporizing the acetic acid, preheating the vapors free from phosphoric acid to a temperature below that to be employed for the thermal dehydration by at most 100° C. and subjecting the preheated vapors to thermal dehydration in the presence of phosphoric acid and a volatile organic nitrogenous base.

HENRY DREYFUS.
LEONARD FALLOWS.